(12) United States Patent
Sexton

(10) Patent No.: US 7,873,161 B2
(45) Date of Patent: Jan. 18, 2011

(54) SMALL HARDWARE IMPLEMENTATION OF THE SUBBYTE FUNCTION OF RIJNDAEL

(75) Inventor: Bonnie C. Sexton, Cary, NC (US)

(73) Assignee: NXP B.V., Eindhoven (NL)

( * ) Notice: Subject to any disclaimer, the term of this patent is extended or adjusted under 35 U.S.C. 154(b) by 1503 days.

(21) Appl. No.: 10/538,556

(22) PCT Filed: Nov. 28, 2003

(86) PCT No.: PCT/IB03/05508

§ 371 (c)(1),
(2), (4) Date: Jun. 13, 2005

(87) PCT Pub. No.: WO2004/056036

PCT Pub. Date: Jul. 1, 2004

(65) Prior Publication Data

US 2006/0109981 A1    May 25, 2006

Related U.S. Application Data

(60) Provisional application No. 60/433,365, filed on Dec. 13, 2002, provisional application No. 60/473,527, filed on May 27, 2003.

(51) Int. Cl.
*H04L 9/28* (2006.01)
*H04K 1/00* (2006.01)
(52) U.S. Cl. .......................... 380/28; 380/37
(58) Field of Classification Search .......... 380/28, 380/37
See application file for complete search history.

(56) References Cited

U.S. PATENT DOCUMENTS

| | | | | |
|---|---|---|---|---|
| 5,091,942 | A * | 2/1992 | Dent | 380/46 |
| 6,937,727 | B2 * | 8/2005 | Yup et al. | 380/37 |
| 7,043,016 | B2 * | 5/2006 | Roelse | 380/29 |
| 7,460,666 | B2 * | 12/2008 | Morioka et al. | 380/37 |
| 2003/0108195 | A1 * | 6/2003 | Okada et al. | 380/37 |
| 2003/0133568 | A1 * | 7/2003 | Stein et al. | 380/37 |
| 2003/0198345 | A1 * | 10/2003 | Van Buer | 380/43 |

FOREIGN PATENT DOCUMENTS

WO    WO 03 010919 A    2/2003

OTHER PUBLICATIONS

Satoh, Akashi et al., "Acompact Rijndael Hardware Architecture with S-Box Optimization," 2001, pp. 239-254.*
Jarvinen, Kimmo et al., "A Fully Pipelined Memoryless 17.8 Gbps AES-128 Encryptor," Feb. 25, 2003, pp. 207-215.*
Rodrigues-Henriquez, F. et al. "4.2 Gbit/s single-chip FPGA implementation of AES algorithm," received Apr. 2, 2003 for Electronics Letters vol. 39 No. 15, Jul. 24, 2003, pp. 1115-1116.*
Mangard, Stefan et al., "A Hightly Regular and Scalable AES Hardware Architecture", IEEE Transaction on Computers, vol. 52, No. 4, Apr. 2003, pp. 483-491.*

(Continued)

*Primary Examiner*—Michael Pyzocha

(57) ABSTRACT

A small hardware implementation is provided for the Advanced Encryption Standard SubByte function that implements the affine transform and inverse transform in a single Affine-All transform using a multiplicative inverse ROM. The logic is greatly reduced and the maximum path delay is reduced compared to a multiplexor implementation and is slightly greater than a ROM implementation.

14 Claims, 3 Drawing Sheets

OTHER PUBLICATIONS

Daemen J et al: "AES Proposal: Rijndaer", AES Proposal, Sep. 3, 1999, pp. 1-45.

Liu Xiangyu and Cao Xiuying, "Hardware Implementation of Rijndael Ciper Algorithm", Communication Technology, No. 8 (2002). (Chinese original with certified English manual translation).

Federal Information Processing Standards Publn. 197, "Announcing the Advanced Encryption Standard (AES)", 51 pgs. (Nov. 26, 2001).

Machine English Translation of specification & claims of WO 03/010919A1(previously cited).

* cited by examiner

| | | UM² | T |
|---|---|---|---|
| ROM (32 x 4 x 1 x 16) | 1627.6 | 20,000 (10,000 X 2) | 2.7 |
| | 1476.6 (738.3 X 2) | 18144.4 (9066 X 2) | 4.24 |
| | 910 97 + 813.8 | 11192.6 1192 + 10000 | 4.7 1.42 + 2.7 |

| GF($2^8$) | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 00 | 01 | 8d | f6 | cb | 52 | 7b | d1 | e8 | 4f | 29 | c0 | b0 | e1 | e5 | c7 |
| 1 | 74 | b4 | aa | 4b | 99 | 2b | 60 | 5f | 58 | 3f | fd | cc | ff | 40 | ee | b2 |
| 2 | 3a | 6e | 5a | f1 | 55 | 4d | a8 | c9 | c1 | 0a | 98 | 15 | 30 | 44 | a2 | c2 |
| 3 | 2c | 45 | 92 | 6c | f3 | 39 | 66 | 42 | f2 | 35 | 20 | 6f | 77 | bb | 59 | 19 |
| 4 | 1d | fe | 37 | 67 | 2d | 31 | f5 | 69 | a7 | 64 | ab | 13 | 54 | 25 | e9 | 09 |
| 5 | ed | 5c | 05 | ca | 4c | 24 | 87 | bf | 18 | 3e | 22 | f0 | 51 | ec | 61 | 17 |
| 6 | 16 | 5e | af | d3 | 49 | a6 | 36 | 43 | f4 | 47 | 91 | df | 33 | 93 | 21 | 3b |
| 7 | 79 | b7 | 97 | 85 | 10 | b5 | ba | 3c | b6 | 70 | d0 | 06 | a1 | fa | 81 | 82 |
| 8 | 83 | 7e | 7f | 80 | 96 | 73 | be | 56 | 9b | 9e | 95 | d9 | f7 | 02 | b9 | a4 |
| 9 | de | 6a | 32 | 6d | d8 | 8a | 84 | 72 | 2a | 14 | 9f | 88 | f9 | dc | 89 | 9a |
| a | fb | 7c | 2e | c3 | 8f | b8 | 65 | 48 | 26 | c8 | 12 | 4a | ce | e7 | d2 | 62 |
| b | 0c | e0 | 1f | ef | 11 | 75 | 78 | 71 | a5 | 8e | 76 | 3d | bd | bc | 86 | 57 |
| c | 0b | 28 | 2f | a3 | da | d4 | e4 | 0f | a9 | 27 | 53 | 04 | 1b | fc | ac | e6 |
| d | 7a | 07 | ae | 63 | c5 | db | e2 | ea | 94 | 8b | c4 | d5 | 9d | f8 | 90 | 6b |
| e | b1 | 0d | d6 | eb | c6 | 0e | cf | ad | 08 | 4e | d7 | e3 | 5d | 50 | 1e | b3 |
| f | 5b | 23 | 38 | 34 | 68 | 46 | 03 | 8c | dd | 9c | 7d | a0 | cd | 1a | 41 | 1c |

SMALL HARDWARE IMPLEMENTATION OF THE SUBBYTE FUNCTION OF RIJNDAEL

CROSS REFERENCE TO RELATED APPLICATION

This application claims the benefit of U.S. provisional application Ser. No. 60/433,365 filed Dec. 13, 2002; and 60/473,527 filed May 27, 2003, which are incorporated herein by reference.

FIELD OF THE INVENTION

The present invention relates to the field of data encryption. The invention relates particularly to an apparatus and method for a small hardware implementation of the SubByte function found in the Advanced Encryption Standard (AES) algorithm or Rijndael Block Cipher, hereinafter AES/Rijndael. The accommodating is redesigned to work with both inverse and normal processing.

DISCUSSION OF THE RELATED ART

The current state of the art provides for hardware implementations where the inverse cipher can only partially re-use the circuitry that implements the cipher. For high-speed networking processors and Smart Card applications a very small (gate size) and high data-rate (accommodating an Optical Carrier Rate of OC-192 and beyond 9953.28 Mbps and a payload of 9.6 Gbps) are desirable.

The AES/Rijndael is an ierataed block cipher and is described in a proposal written by Joan Daemen and Vincent Rijmen and published in Mar. 9, 1999. The National Institute of Standards and Technology (NIST) has approved the AES/Rijndael as a cryptographic algorithm and published the AES/Rijndael in Nov. 26, 2001 (Publication 197 also known as Federal Information Processing Standard 197 or "FIPS 197") which is hereby incorporated by reference as if fully set forth herein). In accordance with many private key encryption/decryption algorithms, including AES/Rijndael, encryption/decryption is performed in multiple stages, commonly known as iterations or rounds. Such algorithms lend themselves to a data processing pipeline or pipelines architecture. In each round, the AES/Rijndael uses the affine transformation and its inverse along with other transformations to decrypt (decipher) and encrypt (encipher) information. Encryption converts data to an unintelligible form called cipher text; decrypting the ciphertext converts the data back into its original form, called plaintext.

The input and output for the AES/Rijndael algorithm each consist of sequences of 128 bits (each having a value of 0 or 1). These sequences are commonly be referred to as blocks and the number of bits they contain are referred to as their length ("FIPS 197", NIST, p. 7). The basic unit for processing in the AES/Rijndael algorithm is a byte, a sequence of eight bits treated as a single entity with most significant bit (MSB) on the left. Internally, the AES/Rijndael algorithm's operations are performed on a two dimensional array of bytes called the State. The State consists of four rows of bytes, each containing Nb bytes, where Nb is the block length divided by 32 ("FIPS 197", NIST, p. 9).

At the start of the Cipher and Inverse Cipher (encryption and decryption), the input—the array of bytes in0, in1, . . . in15 is copied into the State array as illustrated in FIG. 1. The Cipher or Inverse Cipher operations are then conducted on each byte in this State array, after which its final values are copied to the output—the array of bytes out0, out1, . . . out15.

The addition of two elements in a finite field is achieved by "adding" the coefficients for the corresponding powers in the polynomials for the two elements. The addition is performed with the boolean exclusive XOR operation ("FIPS 197", NIST,p 10). The binary notation for adding two bytes is:

$$\{01010111\} \oplus \{10000011\} = \{11010100\} \quad (1.0)$$

In the polynomial representation, multiplication in $GF(2^8)$ corresponds with the multiplication of polynomials modulo an irreducible polynomial of degree 8. A polynomial is irreducible if its only divisors are one and itself. For the AES/Rijndael algorithm, this irreducible polynomial is ("FIPS 197", NIST, p.10):

$$m(x) = x^8 + x^4 + x^3 + x + 1 \quad (1.1)$$

A diagonal matrix with each diagonal element equal to 1 is called an identity matrix. The n×n identity matrix is denoted $I_n$:

$$I_n = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \quad (1.2)$$

If A and B and n×n matrices, we call each an inverse of the other if:

$$AB = BA = I_n \quad (1.3)$$

A transformation consisting of multiplication by a matrix followed by the addition of a vector is called an Affine Transformation.

The SubByte( ) function of AES/Rijndael is a non-linear byte substitution that operates independently on each byte of the State using a substitution table (S-box). This S-box, which is invertible, is constructed by composing two transformations:

1. Take the multiplicative inverse in the finite field $GF(2^8)$, described earlier; the element {00} is mapped to itself.
2. Apply the following affine transformation (over GF(2)):

$$bi' = b_{(i)mod8} \oplus b_{(i+4)mod8} \oplus b_{(i+5)mod8} \oplus b_{(i+6)mod8} \oplus b_{(i+7)mod8} \oplus c_i \quad (1.4)$$

In matrix form, the affine transformation element of the S-box can be expressed as ("FIPS 197",NIST,p16):

$$\begin{bmatrix} b'_0 \\ b'_1 \\ b'_2 \\ b'_3 \\ b'_4 \\ b'_5 \\ b'_6 \\ b'_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 1 \\ 0 \\ 0 \\ 0 \\ 1 \\ 1 \\ 0 \end{bmatrix}. \quad (1.5)$$

If this were implemented as the lookup table as suggested by the AES/Rijndael proposal, a 256 entry ROM or multiplexor would be required. To implement the AES/Rijndael algorithm, 12 instantiations of this table would be required. The inverse of this matrix can be found as:

$$\begin{bmatrix} b'_0 \\ b'_1 \\ b'_2 \\ b'_3 \\ b'_4 \\ b'_5 \\ b'_6 \\ b'_7 \end{bmatrix} = \begin{bmatrix} 0 & 0 & 1 & 0 & 0 & 1 & 0 & 1 \\ 1 & 0 & 0 & 1 & 0 & 0 & 1 & 0 \\ 0 & 1 & 0 & 0 & 1 & 0 & 0 & 1 \\ 1 & 0 & 1 & 0 & 0 & 1 & 0 & 0 \\ 0 & 1 & 0 & 1 & 0 & 0 & 1 & 0 \\ 0 & 0 & 1 & 0 & 1 & 0 & 0 & 1 \\ 1 & 0 & 0 & 1 & 0 & 1 & 0 & 0 \\ 0 & 1 & 0 & 0 & 1 & 0 & 1 & 0 \end{bmatrix} \begin{bmatrix} b_0 \\ b_1 \\ b_2 \\ b_3 \\ b_4 \\ b_5 \\ b_6 \\ b_7 \end{bmatrix} + \begin{bmatrix} 1 \\ 0 \\ 1 \\ 0 \\ 0 \\ 0 \\ 0 \\ 0 \end{bmatrix} \quad (1.6)$$

If this was implemented as the lookup table suggested by the AES/Rijndael proposal, a 128-entry, 16-bit word ROM or multiplexor would be required. To implement the AES/Rijndael algorithm, 12 instantiations of this table would be required.

Thus there is a need for a system and a method of sharing almost all the circuitry for the affine transformation in order to reduce gate count. To achieve a high data-rate and small gate size the design must be architected so that the maximum path is not significantly longer and the gate size is so small that the design can be replicated to promote parallel processing without greatly increasing the die size. Increasing die size adds more expense and power consumption, making the product less marketable. The present invention is an apparatus and a method for decreasing the gate size and at the expense of slightly increasing the maximum path delay. This makes the circuit smaller and thus more attractive for high data-rate designs.

Each occurrence in the AES/Rijndael of the pair of affine transform and inverse affine transform is reduced by the present invention to one transform, the Affine-All transform. In a preferred embodiment, a circuit performs both normal and inverse affine transformations with very little duplicate logic. In this preferred embodiment, by implementing the Affine-All transform with a Multiplicative Inverse ROM, the logic is greatly reduced and the maximum path delay is reduced compared to a multiplexor implementation while only being slightly greater than for a ROM implementation.

Thus, the preferred embodiment of the present invention employs a read-only memory (ROM) for the multiplicative inverse and a reduced combinational logic implementation for the affine transformation. This implementation is very low in gate count with a very comparable maximum delay path.

FIG. 3 illustrates the ROM or lookup table used with the Affine-All transformation of the present invention.

Figures 1, 2:
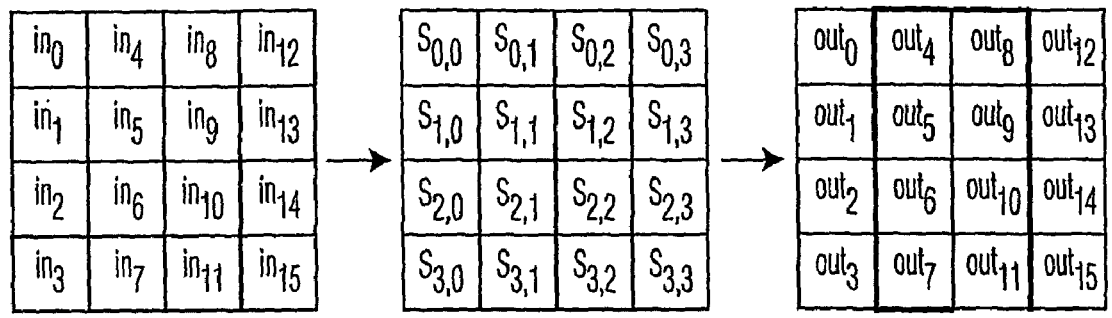
FIG. 1 illustrates state array input and output ("FIPS 197", nist, p.9)
FIG. 2 illustrates comparison of prior art ROM and lookup table (multiplexor) implementation of the subbyte function with Affine-All implementation of the present invention.

The present invention is based, in part, on the fact that beginning at the last row each row of matrix equations (1.5) and (1.6) is shifted left by one bit from the previous row. In the present invention, the first row of each matrix is termed the "load pattern". So the "load pattern" for the affine transform matrix is {10001111} and the "load pattern" for the inverse affine transform is {00100101}. Note that the number of 0's in each "load pattern" is an odd number and is an important characteristic in being able to merge the two transformations into one circuit in the system and method of the present invention.

If both affine transformations are implemented as suggested by Daemen and Rijmen ("FIPS 197") using exclusive OR gates the circuit equations look as follows:

Affine Transform Equations $b'_0 = \overline{5}(b_0 \rho b_4 \rho b_5 \rho b_6 \rho b_7)$ $b'_1 = \overline{5}(b_0 \rho b_1 \rho b_5 \rho b_6 \rho b_7)$ $b'_2 = (b_0 \rho b_1 \rho b_2 \rho b_6 \rho b_7)$ $b'_3 = (b_0 \rho b_1 \rho b_2 \rho b_3 \rho b_7)$ $b'_4 = (b_0 \rho b_1 \rho b_2 \rho b_3 \rho b_4)$ $b'_5 = \overline{5}(b_1 \rho b_2 \rho b_3 \rho b_4 \rho b_5)$ $b'_6 = \overline{5}(b_2 \rho b_3 \rho b_4 \rho b_5 \rho b_6)$ $b'_7 (b_3 \rho b_4 \rho b_5 \rho b_6 \rho b_7)$ \quad (1.7)

Notice that each equation has an odd number of terms and the same number of terms: five. The addition of the vector determines the negation of some equations. So the number of terms in each equation is determined by the "load pattern". The number of negations is determined by the addition of the vector which is termed the "load vector".

Inverse Affine Transform Equations $b'_0 = \overline{5}(b_2 \rho b_5 \rho b_7)$ $b'_1 = (b_0 \rho b_3 \rho b_6)$ $b'_2 = \overline{5}(b_1 \rho b_4 \rho b_7)$ $b'_3 = (b_0 \rho b_2 \rho b_5)$ $b'_4 = (b_1 \rho b_3 \rho b_6)$ $b'_5 = (b_2 \rho b_4 \rho b_7)$ $b'_6 = (b_0 \rho b_3 \rho b_5)$ $b'_7 = (b_1 \rho b_4 \rho b_6)$ Each equation has an odd number of terms and the same number of terms: three. The addition of the vector determines the negation of some equations. So the number of terms in each equation is determined by the "load pattern". The number of negations is determined by the addition of the vector.

This addition vector can now be used as a "load vector" as well. Looking at the two sets of equations it appears that there is no common logic to be merged. If the equations are rewritten with the "load pattern" included and use the addition of the vector to determine the negations, a common circuit is revealed. The properties of the exclusive OR are used to accomplish this and these properties are:

$A \oplus B \oplus C = C \oplus B \oplus A$ \quad (1.9)

$A \oplus 0 = A$ \quad (2.0)

$A \oplus 1 = \neg A$ \quad (2.1)

$A \oplus A = 0$ \quad (2.2)

In a preferred embodiment, the circuit implementing both the affine and inverse affine transforms comprises a Multiplicative Inverse ROM and the logic that represents both transforms is as follows with p as the "load pattern" and v as the "load vector". For example, here is what equation seven of the affine matrix becomes:

$$b'_7 = [(b_0 \cong p_1)\rho(b_1 \cong p_2)\rho(b_2 \cong p_3)\rho(b_3 \cong p_4)\rho(b_4 \cong p_5)\rho \\ (b_5 \cong p_6)\rho(b_6 \cong p_7)\rho(b_7 \cong p_0)]\rho v_7 \quad (2.3)$$

The number of instantiations has been cut in half. Because of the 0's produced by the ANDing of p and b, the equation works for both affine and inverse affine transformations. Because b XOR'ed with a 1 is always the inverse of b, using $v_7$ each time negates the equation where appropriate.

Comparisons:

Using the design suggested by the AES/Rijndael proposal (FIPS 197) implemented in two ways:

(1) a 128-entry, 16-bit word ROM, and (2) a 128-entry, 16-bit word lookup table implemented as a multiplexor, the ROM, Multiplexor and the Affine-All circuit embodiment of the present invention were synthesized and timed using maximum path analysis. FIG. 2 compares results where sizes in gates are given as well as sizes in microns for comparison with the ROM implementation. Net area is not considered because wire load models differ with technologies.

A preferred embodiment of the ROM or Lookup table contains the values shown in FIG. 3, in hexadecimal format.

Figure 4:
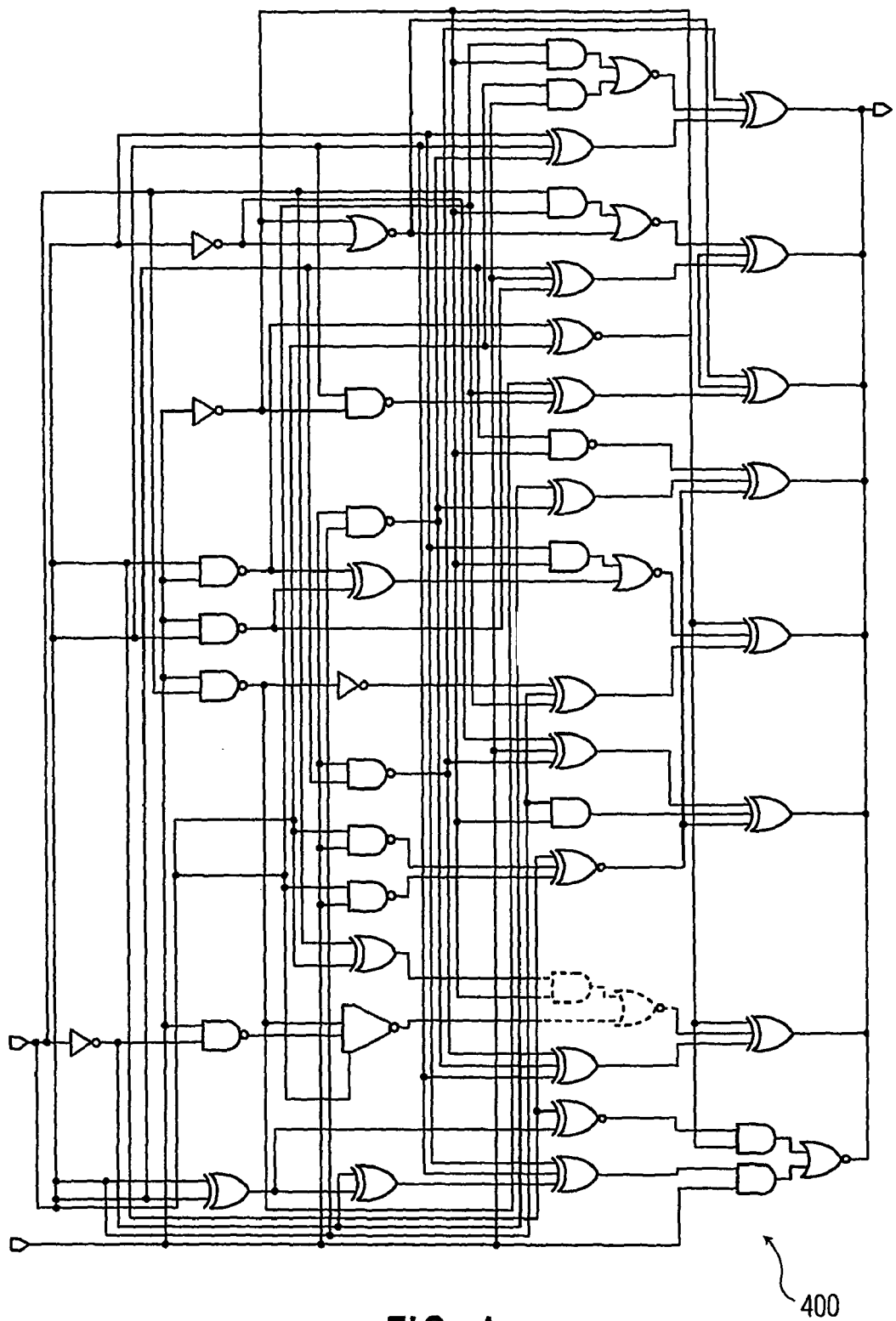
FIG. 4 illustrates the netlist of the Affine-All combinational logic.

The net list of the Affine-All combinational logic of a preferred embodiment is shown in FIG. 4. The code for an implementation is included as Appendix A.

The present invention is applicable to all systems and devices capable of secure communications, comprising security networking processors, secure keyboard devices, magnetic card reader devices, smart card reader devices, and wireless 802.11 devices.

The above describe embodiments are only typical examples, and their modifications and variations are apparent to those skilled in the art. Various modifications to the above-described embodiments can be made without departing from the scope of the invention as embodied in the accompanying claims.

Appendix A

The RTL to implement the affine all circuit is shown below:

```
`timescale 10ns/10ns
module aes_affine_all
(
byteOut, // output byte
byteIn, // input byte
enCrypt // 1 = encrypt 0 = decrypt
);
// ---------------------------------------------------------------------
// ports
// ---------------------------------------------------------------------
input enCrypt;
input [7:0] byteIn;
output [7:0] byteOut;
// Logic reduction
wire [4:0] byteOut_int;
wire [0:7] y_inv,y,y_int;
wand byteOut_7_0,byteOut_7_1,byteOut_7_2,byteOut_7_3,byteOut_7_4,byteOut_7_5,
byteOut_7_6,byteOut_7_7;
wand byteOut_4_0,byteOut_4_1,byteOut_4_2,byteOut_4_3,byteOut_4_4,byteOut_4_5,
byteOut_4_6,byteOut_4_7;
wand
byteOut_int_4_0,byteOut_int_4_1,byteOut_int_4_2,byteOut_int_4_3,byteOut_int_4_4,
byteOut_int_4_5, byteOut_int_4_6, byteOut_int_4_7;
wand
byteOut_int_3_0,byteOut_int_3_1,byteOut_int_3_2,byteOut_int_3_3,byteOut_int_3_4,
byteOut_int_3_5,byteOut_int_3_6, byteOut_int_3_7;
wand byteOut_3_0,byteOut_3_1,byteOut_3_2,byteOut_3_3,byteOut_3_4,byteOut_3_5,
byteOut_3_6,byteOut_3_7;
wand
byteOut_int_2_0,byteOut_int_2_1,byteOut_int_2_2,byteOut_int_2_3,byteOut_int_2_4,
byteOut_int_2_5,byteOut_int_2_6, byteOut_int_2_7;
wand
byteOut_int_1_0,byteOut_int_1_1,byteOut_int_1_2,byteOut_int_1_3,byteOut_int_1_4,
byteOut_int_1_5,byteOut_int_1_6, byteOut_int_1_7;
wand
byteOut_int_0_0,byteOut_int_0_1,byteOut_int_0_2,byteOut_int_0_3,byteOut_int_0_4,
byteOut_int_0_5,byteOut_int_0_6, byteOut_int_0_7;
assign y_inv = 8'b00100101;
assign y = 8'b10001111;
assign y_int = (enCrypt) ? y : y_inv;
assign byteOut_7_0 = byteIn [0];
assign byteOut_7_0 = y_int[1];
assign byteOut_7_1 = byteIn [1];
assign byteOut_7_1 = y_int[2];
assign byteOut_7_2 = byteIn [2];
assign byteOut_7_2 = y_int[3];
assign byteOut_7_3 = byteIn [3];
```

```
assign byteOut_7_3 = y_int[4];
assign byteOut_7_4 = byteIn [4];
assign byteOut_7_4 = y_int[5];
assign byteOut_7_5 = byteIn [5];
assign byteOut_7_5 = y_int[6];
assign byteOut_7_6 = byteIn [6];
assign byteOut_7_6 = y_int[7];
assign byteOut_7_7 = byteIn [7];
assign byteOut_7_7 = y_int[0];
assign byteOut [7] = byteOut_7_0^ byteOut_7_1^ byteOut_7_2^ byteOut_7_3^
   byteOut_7_4^ byteOut_7_5^ byteOut_7_6^ byteOut_7_7;
assign byteOut_int_4_0 = byteIn [0];
assign byteOut_int_4_0 = y_int[2];
assign byteOut_int_4_1 = byteIn [1];
assign byteOut_int_4_1 = y_int[3];
assign byteOut_int_4_2 = byteIn [2];
assign byteOut_int_4_2 = y_int[4];
assign byteOut_int_4_3 = byteIn [3];
assign byteOut_int_4_3 = y_int[5];
assign byteOut_int_4_4 = byteIn [4];
assign byteOut_int_4_4 = y_int[6];
assign byteOut_int_4_5 = byteIn [5];
assign byteOut_int_4_5 = y_int[7];
assign byteOut_int_4_6 = byteIn [6];
assign byteOut_int_4_6 = y_int[0];
assign byteOut_int_4_7 = byteIn [7];
assign byteOut_int_4_7 = y_int[1];
assign byteOut_int [4] = byteOut_int_4_0^ byteOut_int_4_1^ byteOut_int_4_2^
   byteOut_int_4_3^ byteOut_int_4_4^
   byteOut_int_4_5^ byteOut_int_4_6^ byteOut_int_4_7;
assign byteOut_int_3_0 = byteIn [0];
assign byteOut_int_3_0 = y_int[3];
assign byteOut_int_3_1 = byteIn [1];
assign byteOut_int_3_1 = y_int[4];
assign byteOut_int_3_2 = byteIn [2];
assign byteOut_int_3_2 = y_int[5];
assign byteOut_int_3_3 = byteIn [3];
assign byteOut_int_3_3 = y_int[6];
assign byteOut_int_3_4 = byteIn [4];
assign byteOut_int_3_4 = y_int[7];
assign byteOut_int_3_5 = byteIn [5];
assign byteOut_int_3_5 = y_int[0];
assign byteOut_int_3_6 = byteIn [6];
assign byteOut_int_3_6 = y_int[1];
assign byteOut_int_3_7 = byteIn [7];
assign byteOut_int_3_7 = y_int[2];
assign byteOut_int [3] = byteOut_int_3_0^ byteOut_int_3_1^ byteOut_int_3_2^
   byteOut_int_3_3^ byteOut_int_3_4^
   byteOut_int_3_5^ byteOut_int_3_6^ byteOut_int_3_7;
assign byteOut_4_0 = byteIn [0];
assign byteOut_4_0 = y_int[4];
assign byteOut_4_1 = byteIn [1];
assign byteOut_4_1 = y_int[5];
assign byteOut_4_2 = byteIn [2];
assign byteOut_4_2 = y_int[6];
assign byteOut_4_3 = byteIn [3];
assign byteOut_4_3 = y_int[7];
assign byteOut_4_4 = byteIn [4];
assign byteOut_4_4 = y_int[0];
assign byteOut_4_5 = byteIn [5];
assign byteOut_4_5 = y_int[1];
assign byteOut_4_6 = byteIn [6];
assign byteOut_4_6 = y_int[2];
assign byteOut_4_7 = byteIn [7];
assign byteOut_4_7 = y_int[3];
assign byteOut [4] =byteOut_4_0^ byteOut_4_1^ byteOut_4_2^
   byteOut_4_3^ byteOut_4_4^
   byteOut_4_5^ byteOut_4_6^ byteOut_4_7;
assign byteOut_3_0 = byteIn [0];
assign byteOut_3_0 = y_int[5];
assign byteOut_3_1 = byteIn [1];
assign byteOut_3_1 = y_int[6];
assign byteOut_3_2 = byteIn [2];
assign byteOut_3_2 = y_int[7];
assign byteOut_3_3 = byteIn [3];
assign byteOut_3_3 = y_int[0];
assign byteOut_3_4 = byteIn [4];
assign byteOut_3_4 = y_int[1];
assign byteOut_3_5 = byteIn [5];
```

-continued

```
assign byteOut_3_5 = y_int[2];
assign byteOut_3_6 = byteIn [6];
assign byteOut_3_6 = y_int[3];
assign byteOut_3_7 = byteIn [7];
assign byteOut_3_7 = y_int[4];
assign byteOut[3] = byteOut_3_0^ byteOut_3_1^ byteOut_3_2^
byteOut_3_3^ byteOut_3_4^
byteOut_3_5^ byteOut_3_6^ byteOut_3_7;
assign byteOut_int_2_0 = byteIn [0];
assign byteOut_int_2_0 = y_int[6];
assign byteOut_int_2_1 = byteIn [1];
assign byteOut_int_2_1 = y_int[7];
assign byteOut_int_2_2 = byteIn [2];
assign byteOut_int_2_2 = y_int[0];
assign byteOut_int_2_3 = byteIn [3];
assign byteOut_int_2_3 = y_int[1];
assign byteOut_int_2_4 = byteIn [4];
assign byteOut_int_2_4 = y_int[2];
assign byteOut_int_2_5 = byteIn [5];
assign byteOut_int_2_5 = y_int[3];
assign byteOut_int_2_6 = byteIn [6];
assign byteOut_int_2_6 = y_int[4];
assign byteOut_int_2_7 = byteIn [7];
assign byteOut_int_2_7 = y_int[5];
assign byteOut_int [2] =(~byteOut_int_2_0 & byteOut_int_2_1| ~byteOut_int_2_1 &
byteOut_int_2_0)^
(~byteOut_int_2_2 & byteOut_int_2_3 | ~byteOut_int_2_3 & byteOut_int_2_2)^
(~byteOut_int_2_4 & byteOut_int_2_5 | ~byteOut_int_2_5 & byteOut_int_2_4)^
(~byteOut_int_2_6&byteOut_int_2_7 | ~byteOut_int_2_7&byteOut_int_2_6);
assign byteOut_int_1_0 = byteIn [0];
assign byteOut_int_1_0 = y_int[7];
assign byteOut_int_1_1 = byteIn [1];
assign byteOut_int_1_1 = y_int[0];
assign byteOut_int_1_2 = byteIn [2];
assign byteOut_int_1_2 = y_int[1];
assign byteOut_int_1_3 = byteIn [3];
assign byteOut_int_1_3 = y_int[2];
assign byteOut_int_1_4 = byteIn [4];
assign byteOut_int_1_4 = y_int[3];
assign byteOut_int_1_5 = byteIn [5];
assign byteOut_int_1_5 = y_int[4];
assign byteOut_int_1_6 = byteIn [6];
assign byteOut_int_1_6 = y_int[5];
assign byteOut_int_1_7 = byteIn [7];
assign byteOut_int_1_7 = y_int[6];
assign byteOut_int [1] =byteOut_int_1_0^ byteOut_int_1_1^ byteOut_int_1_2^
byteOut_int_1_3^ byteOut_int_1_4^
byteOut_int_1_5^ byteOut_int_1_6^ byteOut_int_1_7;
assign byteOut_int_0_0 = byteIn [0];
assign byteOut_int_0_0 = y_int[0];
assign byteOut_int_0_1 = byteIn [1];
assign byteOut_int_0_1 = y_int[1];
assign byteOut_int_0_2 = byteIn [2];
assign byteOut_int_0_2 = y_int[2];
assign byteOut_int_0_3 = byteIn [3];
assign byteOut_int_0_3 = y_int[3];
assign byteOut_int_0_4 = byteIn [4];
assign byteOut_int_0_4 = y_int[4];
assign byteOut_int_0_5 = byteIn [5];
assign byteOut_int_0_5 = y_int[5];
assign byteOut_int_0_6 = byteIn [6];
assign byteOut_int_0_6 = y_int[6];
assign byteOut_int_0_7 = byteIn [7];
assign byteOut_int_0_7 = y_int[7];
assign byteOut_int [0] =byteOut_int_0_0^ byteOut_int_0_1 ^ byteOut_int_0_2^
byteOut_int_0_3^ byteOut_int_0_4^
byteOut_int_0_5^ byteOut_int_0_6^ byteOut_int_0_7;
assign byteOut [6] = (enCrypt) ? ~byteOut_int[4]: byteOut_int[4];
assign byteOut [5] = (enCrypt) ? ~byteOut_int[3]: byteOut_int[3];
assign byteOut [2] = (enCrypt) ? byteOut_int [2] : ~byteOut_int [2];
assign byteOut [1] = (enCrypt) ? ~byteOut_int[1]: byteOut_int[1];
assign byteOut [0] = ~byteOut_int [0];
endmodule
```

The invention claimed is:

1. An apparatus for performing a SubByte function of the Rijndael Block Cipher, comprising:

an S-box circuit including
an inverse transformation circuit having a lookup table and being configured and arranged to transform an input using a look-up table, wherein the look-up table is the multiplicative inverse in the finite field $GF(2^8)$ having $\{00\}$ mapped to itself, and the look-up table is implemented by a read-only memory (ROM);

a combinational logic circuit configured and arranged to perform an affine-all transformation that performs both an affine and inverse affine transformation in response to respective load patterns, wherein the combinatorial logic circuit implements the equations:

$b'_0 = [(b_0 \cdot p_0) \oplus (b_1 \cdot p_1) \oplus (b_2 \cdot p_2) \oplus (b_3 \cdot p_3) \oplus (b_4 \cdot p_4) \oplus (b_5 \cdot p_5) \oplus (b_6 \cdot p_6) \oplus (b_7 \cdot p_7)] \oplus v_0$ $b'_1 = [(b_0 \cdot p_7) \oplus (b_1 \cdot p_0) \oplus (b_2 \cdot p_1) \oplus (b_3 \cdot p_2) \oplus (b_4 \cdot p_3) \oplus (b_5 \cdot p_4) \oplus (b_6 \cdot p_5) \oplus (b_7 \cdot p_6)] \oplus v_1$ $b'_2 = [(b_0 \cdot p_6) \oplus (b_1 \cdot p_7) \oplus (b_2 \cdot p_0) \oplus (b_3 \cdot p_1) \oplus (b_4 \cdot p_2) \oplus (b_5 \cdot p_3) \oplus (b_6 \cdot p_4) \oplus (b_7 \cdot p_5)] \oplus v_2$ $b'_3 = [(b_0 \cdot p_5) \oplus (b_1 \cdot p_6) \oplus (b_2 \cdot p_7) \oplus (b_3 \cdot p_0) \oplus (b_4 \cdot p_1) \oplus (b_5 \cdot p_2) \oplus (b_6 \cdot p_3) \oplus (b_7 \cdot p_4)] \oplus v_3$ $b'_4 = [(b_0 \cdot p_4) \oplus (b_1 \cdot p_5) \oplus (b_2 \cdot p_6) \oplus (b_3 \cdot p_7) \oplus (b_4 \cdot p_0) \oplus (b_5 \cdot p_1) \oplus (b_6 \cdot p_2) \oplus (b_7 \cdot p_3)] \oplus v_4$ $b'_5 = [(b_0 \cdot p_3) \oplus (b_1 \cdot p_4) \oplus (b_2 \cdot p_5) \oplus (b_3 \cdot p_6) \oplus (b_4 \cdot p_7) \oplus (b_5 \cdot p_0) \oplus (b_6 \cdot p_1) \oplus (b_7 \cdot p_2)] \oplus v_5$ $b'_6 = [(b_0 \cdot p_2) \oplus (b_1 \cdot p_3) \oplus (b_2 \cdot p_4) \oplus (b_3 \cdot p_5) \oplus (b_4 \cdot p_6) \oplus (b_5 \cdot p_7) \oplus (b_6 \cdot p_0) \oplus (b_7 \cdot p_1)] \oplus v_6$ $b'_7 = [(b_0 \cdot p_1) \oplus (b_1 \cdot p_2) \oplus (b_2 \cdot p_3) \oplus (b_3 \cdot p_4) \oplus (b_4 \cdot p_5) \oplus (b_5 \cdot p_6) \oplus (b_6 \cdot p_7) \oplus (b_7 \cdot p_0)] \oplus v_7$ having $p = p_0 p_1 p_2 p_3 p_4 p_5 p_6 p_7$ a load pattern consisting of $\{10001111\}$ for the affine transformation and $\{00100101\}$ for the inverse affine transformation and having v as a load vector $= v_0 v_1 v_2 v_3 v_4 v_5 v_6 v_7$ consisting of $\{11000110\}$ for the affine transformation and $\{10100000\}$ for the inverse affine transformation.

2. An apparatus for encrypting and decrypting data, comprising:

a data processing module arranged to perform a byte substitution, wherein at least part of said data processing module comprises:

a look-up table which is the multiplicative inverse in the finite field $GF(2^8)$ having $\{00\}$ mapped to itself, and the look-up table is implemented by a read-only memory (ROM), a storage device for storing the look-up table, and a circuit having shared logic that performs a single transform that accomplishes an affine and an inverse affine transformation, wherein the circuit having shared logic implements the equations:

$b'_0 = [(b_0 \cdot p_0) \oplus (b_1 \cdot p_1) \oplus (b_2 \cdot p_2) \oplus (b_3 \cdot p_3) \oplus (b_4 \cdot p_4) \oplus (b_5 \cdot p_5) \oplus (b_6 \cdot p_6) \oplus (b_7 \cdot p_7)] \oplus v_0$ $b'_1 = [(b_0 \cdot p_7) \oplus (b_1 \cdot p_0) \oplus (b_2 \cdot p_1) \oplus (b_3 \cdot p_2) \oplus (b_4 \cdot p_3) \oplus (b_5 \cdot p_4) \oplus (b_6 \cdot p_5) \oplus (b_7 \cdot p_6)] \oplus v_1$ $b'_2 = [(b_0 \cdot p_6) \oplus (b_1 \cdot p_7) \oplus (b_2 \cdot p_0) \oplus (b_3 \cdot p_1) \oplus (b_4 \cdot p_2) \oplus (b_5 \cdot p_3) \oplus (b_6 \cdot p_4) \oplus (b_7 \cdot p_5)] \oplus v_2$ $b'_3 = [(b_0 \cdot p_5) \oplus (b_1 \cdot p_6) \oplus (b_2 \cdot p_7) \oplus (b_3 \cdot p_0) \oplus (b_4 \cdot p_1) \oplus (b_5 \cdot p_2) \oplus (b_6 \cdot p_3) \oplus (b_7 \cdot p_4)] \oplus v_3$ $b'_4 = [(b_0 \cdot p_4) \oplus (b_1 \cdot p_5) \oplus (b_2 \cdot p_6) \oplus (b_3 \cdot p_7) \oplus (b_4 \cdot p_0) \oplus (b_5 \cdot p_1) \oplus (b_6 \cdot p_2) \oplus (b_7 \cdot p_3)] \oplus v_4$ $b'_5 = [(b_0 \cdot p_3) \oplus (b_1 \cdot p_4) \oplus (b_2 \cdot p_5) \oplus (b_3 \cdot p_6) \oplus (b_4 \cdot p_7) \oplus (b_5 \cdot p_0) \oplus (b_6 \cdot p_1) \oplus (b_7 \cdot p_2)] \oplus v_5$ $b'_6 = [(b_0 \cdot p_2) \oplus (b_1 \cdot p_3) \oplus (b_2 \cdot p_4) \oplus (b_3 \cdot p_5) \oplus (b_4 \cdot p_6) \oplus (b_5 \cdot p_7) \oplus (b_6 \cdot p_0) \oplus (b_7 \cdot p_1)] \oplus v_6$ $b'_7 = [(b_0 \cdot p_1) \oplus (b_1 \cdot p_2) \oplus (b_2 \cdot p_3) \oplus (b_3 \cdot p_4) \oplus (b_4 \cdot p_5) \oplus (b_5 \cdot p_6) \oplus (b_6 \cdot p_7) \oplus (b_7 \cdot p_0)] \oplus v_7$ having $p = p_0 p_1 p_2 p_3 p_4 p_5 p_6 p_7$ as a load pattern consisting of $\{10001111\}$ for the affine transformation and $\{00100101\}$ for the inverse affine transformation and having v as a load vector $= v_0 v_1 v_2 v_3 v_4 v_5 v_6 v_7$ consisting of $\{11000110\}$ for the affine transformation and $\{10100000\}$ for the inverse affine transformation.

3. The apparatus as claimed in claim 2, wherein the apparatus comprises a plurality of instances of a data processing module arranged in a data processing pipeline.

4. The apparatus as claimed in claim 2, wherein the apparatus is arranged to perform encryption or decryption in accordance with the Rijndael Block Cipher, and wherein the data processing module is arranged to implement a Rijndael round.

5. An apparatus as claimed in claim 4, wherein the data processing module is arranged to implement the SubByte transformation of the Rijndael round using the lookup table composed with the affine transformation for encryption and the inverse affine transformation for decryption.

6. The apparatus as claimed in claim 5, wherein said lookup table is implemented by means of a read only memory (ROM).

7. The apparatus as claimed in claim 2, wherein, for a given input vector having a number of bits, the shared logic is configured to perform an inverse affine transform responsive to one load pattern and to perform an affine transformation responsive to another load pattern, the load patterns having the same number of bits as the input vector.

8. A apparatus for performing a SubByte function of a round of the Rijndael Block Cipher, comprising an S-box constructed by composing, means for obtaining the multiplicative inverse in the finite field $GF(2^8)$, and means for performing an affine-all transformation Consisting of an affine and inverse affine transformation as a single affine transformation, wherein the means for performing implements the equations:

$b'_0 = [(b_0 \cdot p_0) \oplus (b_1 \cdot p_1) \oplus (b_2 \cdot p_2) \oplus (b_3 \cdot p_3) \oplus (b_4 \cdot p_4) \oplus (b_5 \cdot p_5) \oplus (b_6 \cdot p_6) \oplus (b_7 \cdot p_7)] \oplus v_0$ $b'_1 = [(b_0 \cdot p_7) \oplus (b_1 \cdot p_0) \oplus (b_2 \cdot p_1) \oplus (b_3 \cdot p_2) \oplus (b_4 \cdot p_3) \oplus (b_5 \cdot p_4) \oplus (b_6 \cdot p_5) \oplus (b_7 \cdot p_6)] \oplus v_1$ $b'_2 = [(b_0 \cdot p_6) \oplus (b_1 \cdot p_7) \oplus (b_2 \cdot p_0) \oplus (b_3 \cdot p_1) \oplus (b_4 \cdot p_2) \oplus (b_5 \cdot p_3) \oplus (b_6 \cdot p_4) \oplus (b_7 \cdot p_5)] \oplus v_2$ $b'_3 = [(b_0 \cdot p_5) \oplus (b_1 \cdot p_6) \oplus (b_2 \cdot p_7) \oplus (b_3 \cdot p_0) \oplus (b_4 \cdot p_1) \oplus (b_5 \cdot p_2) \oplus (b_6 \cdot p_3) \oplus (b_7 \cdot p_4)] \oplus v_3$ $b'_4 = [(b_0 \cdot p_4) \oplus (b_1 \cdot p_5) \oplus (b_2 \cdot p_6) \oplus (b_3 \cdot p_7) \oplus (b_4 \cdot p_0) \oplus (b_5 \cdot p_1) \oplus (b_6 \cdot p_2) \oplus (b_7 \cdot p_3)] \oplus v_4$ $b'_5 = [(b_0 \cdot p_3) \oplus (b_1 \cdot p_4) \oplus (b_2 \cdot p_5) \oplus (b_3 \cdot p_6) \oplus (b_4 \cdot p_7) \oplus (b_5 \cdot p_0) \oplus (b_6 \cdot p_1) \oplus (b_7 \cdot p_2)] \oplus v_5$ $b'_6 = [(b_0 \cdot p_2) \oplus (b_1 \cdot p_3) \oplus (b_2 \cdot p_4) \oplus (b_3 \cdot p_5) \oplus (b_4 \cdot p_6) \oplus (b_5 \cdot p_7) \oplus (b_6 \cdot p_0) \oplus (b_7 \cdot p_1)] \oplus v_6$ $b'_7 = [(b_0 \cdot p_1) \oplus (b_1 \cdot p_2) \oplus (b_2 \cdot p_3) \oplus (b_3 \cdot p_4) \oplus (b_4 \cdot p_5) \oplus (b_5 \cdot p_6) \oplus (b_6 \cdot p_7) \oplus (b_7 \cdot p_0)] \oplus v_7$ having $p = p_0 p_1 p_2 p_3 p_4 p_5 p_6 p_7$ as a load pattern consisting of $\{1000111\}$ for the affine transformation and $\{0010010\}$ for the inverse affine transformation and having v as a load vector $= v_0 v_1 v_2 v_3 v_4 v_5 v_6 v_7$ consisting of {11000110} for the affine transformation and {10100000} for the inverse affine transformation.

9. The apparatus as claimed in claim 8, wherein said means for obtaining the multiplicative inverse is a look-up table, and said means for performing the affine-all transformation is a combinational logic circuit.

10. A method for performing a SubByte function of a Rijndael round of the Rijndael Block Cipher, comprising the steps of creating a look-up table for the multiplicative inverse in the finite field $GF(2^8)$;

providing an affine-all transformation consisting of an affine and inverse affine transformation in a single affine transformation, using the equations:

$b'_0 = [(b_0 \cdot p_0) \oplus (b_1 \cdot p_1) \oplus (b_2 \cdot p_2) \oplus (b_3 \cdot p_3) \oplus (b_4 \cdot p_4) \oplus (b_5 \cdot p_5) \oplus (b_6 \cdot p_6) \oplus (b_7 \cdot p_7)] \oplus v_0$ $b'_1 = [(b_0 \cdot p_7) \oplus (b_1 \cdot p_0) \oplus (b_2 \cdot p_1) \oplus (b_3 \cdot p_2) \oplus (b_4 \cdot p_3) \oplus (b_5 \cdot p_4) \oplus (b_6 \cdot p_5) \oplus (b_7 \cdot p_6)] \oplus v_1$ $b'_2 = [(b_0 \cdot p_6) \oplus (b_1 \cdot p_7) \oplus (b_2 \cdot p_0) \oplus (b_3 \cdot p_1) \oplus (b_4 \cdot p_2) \oplus (b_5 \cdot p_3) \oplus (b_6 \cdot p_4) \oplus (b_7 \cdot p_5)] \oplus v_2$ $b'_3 = [(b_0 \cdot p_5) \oplus (b_1 \cdot p_6) \oplus (b_2 \cdot p_7) \oplus (b_3 \cdot p_0) \oplus (b_4 \cdot p_1) \oplus (b_5 \cdot p_2) \oplus (b_6 \cdot p_3) \oplus (b_7 \cdot p_4)] \oplus v_3$ $b'_4 = [(b_0 \cdot p_4) \oplus (b_1 \cdot p_5) \oplus (b_2 \cdot p_6) \oplus (b_3 \cdot p_7) \oplus (b_4 \cdot p_0) \oplus (b_5 \cdot p_1) \oplus (b_6 \cdot p_2) \oplus (b_7 \cdot p_3)] \oplus v_4$ $b'_5 = [(b_0 \cdot p_3) \oplus (b_1 \cdot p_4) \oplus (b_2 \cdot p_5) \oplus (b_3 \cdot p_6) \oplus (b_4 \cdot p_7) \oplus (b_5 \cdot p_0) \oplus (b_6 \cdot p_1) \oplus (b_7 \cdot p_2)] \oplus v_5$ $b'_6 = [(b_0 \cdot p_2) \oplus (b_1 \cdot p_3) \oplus (b_2 \cdot p_4) \oplus (b_3 \cdot p_5) \oplus (b_4 \cdot p_6) \oplus (b_5 \cdot p_7) \oplus (b_6 \cdot p_0) \oplus (b_7 \cdot p_1)] \oplus v_6$ $b'_7 = [(b_0 \cdot p_1) \oplus (b_1 \cdot p_2) \oplus (b_2 \cdot p_3) \oplus (b_3 \cdot p_4) \oplus (b_4 \cdot p_5) \oplus (b_5 \cdot p_6) \oplus (b_6 \cdot p_7) \oplus (b_7 \cdot p_0)] \oplus v_7$ having $p = p_0 p_1 p_2 p_3 p_4 p_5 p_6 p_7$ as a load pattern consisting of {10001111} for the affine transformation and {00100101} for the inverse affine transformation and having v as a load vector = $v_0 v_1 v_2 v_3 v_4 v_5 v_6 v_7$ consisting of {11000110} for the affine transformation and {10100000} for the inverse affine transformation;

composing an S-box constructed of the look-up table and the affine-all transformation; and performing a non-linear byte substitution using the composed S-box.

11. The method of claim 10, wherein the providing step further comprises the step of providing a shared logic circuit that performs the single affine transformation.

12. The method of claim 10, further comprising the step of storing the look-up table in a read-only memory (ROM).

13. The method of claim 12, wherein the providing step further comprises the step of implementing a shared logic circuit that performs the single affine transformation.

14. The method of claim 10, wherein:

the look-up table is the multiplicative inverse in the finite field $GF(2^8)$ having {00} mapped to itself; and the providing step further comprises the step of implementing a combinational logic circuit that performs the single affine transformation.

\* \* \* \* \*